Patented Sept. 14, 1948

2,449,471

UNITED STATES PATENT OFFICE 2,449,471

PREPARATION OF ETHER ESTERS

William F. Gresham, Wilmington, Del., assignor to E. I. du Pont de Nemours & Company, Wilmington, Del., a corporation of Delaware No Drawing. Application November 1, 1946, Serial No. 707,339

3 Claims. (Cl. 260—484)

This invention relates to a process for the preparation of aliphatic organic acid esters and more particularly to the preparation of dialkoxy monocarboxylic acid esters from ketenes and esters of ortho-aliphatic carboxylic acids.

An object of the present invention is to provide a process for the preparation of new compositions of matter. A further object is to provide new compositions of matter having the generic formula:

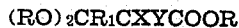
$(RO)_2CR_1CXYCOOR$ wherein R is an alkyl or aryl group and $R_1$, X, and Y are hydrogen, alkyl, or aryl groups. A further object is to provide a process wherein ketenes combine with ortho-aliphatic carboxylic acid esters in the presence of an acid catalyst. Other objects and advantages of the invention will hereinafter appear.

The above and other objects are realized by subjecting an ortho-ester, preferably acidified, of an aliphatic carboxylic acid to reaction with ketene. The reaction is highly exothermic, taking place spontaneously, immediately upon the addition of the ketene to the ortho-ester. The reaction may be conducted by first acidifying the ortho-ester and then bubbling or otherwise introducing the ketene as a gas into the acidified ester.

Generically the reaction may be illustrated by the equation:

1. 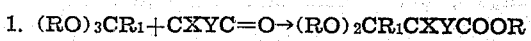
$(RO)_3CR_1 + CXYC=O \rightarrow (RO)_2CR_1CXYCOOR$ wherein R is an alkyl group such as methyl, ethyl, n- and iso- propyl, n- and iso- butyl or a higher alkyl group, an aryl group such as phenyl, tolyl and so forth, or a substituted alkyl or aryl group, $R_1$ is hydrogen or an alkyl group such as the alkyl groups described under R, and X and Y may be hydrogen, an alkyl or aryl group similar or dissimilar to the R or $R_1$ group. By substituting in the R, $R_1$, X and Y positions the formula designates the reaction of ortho-formic, ortho-acetic and ortho-aliphatic carboxylic acid esters with ketenes.

A specific embodiment of the invention is illustrated by the equation:

2. $(C_2H_5O)_3CH + CH_2C=O \rightarrow$
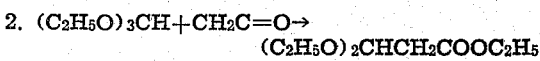
$(C_2H_5O)_2CHCH_2COOC_2H_5$ wherein ethyl ortho-formate is reacted with ketene to give ethyl 3,3-diethoxypropionate.

The reaction is preferably conducted at comparatively low temperatures ranging up to a maximum of about 150° C. and down to about —80° C. with the optimum temperature in the neighborhood of 0° C. The reaction may be conducted under reduced or superatmospheric pressures if desired. While as has been stated the reaction takes place spontaneously and with the evolution of heat, it is desirable to maintain the temperature of the reaction within prescribed limits and this may be accomplished by suitable cooling means. The ketene vapors may be introduced into the acidified ortho-aliphatic carboxylic acid esters by bubbling, diffusion or by any other suitable dispersing method. A solvent such as an ether or hydrocarbon may be employed.

The catalyst used for the reaction may be any suitable acid catalyst such as sulfuric acid, phosphoric acid, benzene sulfonic acid, zinc chloride, ferric chloride, aluminum chloride, boron trifluoride and its addition products with ethers, esters, and the like, the Friedel-Crafts type catalysts or combinations of these catalysts. The catalyst may be present in amounts ranging from approximately 0.2 to 100% based on the weight of the acetal or ketal, the proportions of catalyst depending primarily on its activity and on the temperature employed. Minimum amounts of water only can be tolerated inasmuch as ketene is destroyed in its presence.

Ketenes that may be used include the aldoketenes having the formula $RCH:CO$ in which R is hydrogen or alkyl, and the keto-ketenes having the formula $R_2C:CO$ in which R is an alkyl group such as methyl, ethyl or propyl or an aryl group such as phenyl or tolyl.

The ortho-aliphatic carboxylic acid esters that may be used include the alkyl ortho formates such as the methyl, ethyl, propyl and higher straight and branched chain alkyl ortho-formates as well as similar esters of the ortho-acetates and higher ortho-acylates, such as are generically described and illustrated by the first member of Equation 1.

Accordingly by the reaction of ketene with methyl ortho-formate, ethyl ortho-formate, methyl ortho-acetate, ethyl ortho-acetate, and equivalent acylates, there are produced respectively methyl 3,3-dimethoxypropionate; ethyl-3,3-diethoxypropionate; methyl 3,3-dimethoxy-3-methyl proprionate; ethyl-3,3-diethoxy-3-methyl propionate and like esters.

The esters are recovered from the reaction mixture after first neutralizing the acid thereof by addition of a suitable alkali such as an alkali metal alcoholate, e. g., sodium methoxide, or sodium carbonate, or similar alkaline agents, such as anhydrous ammonia, the addition being continued until the mixture is neutral or basic to wet litmus. Any precipitated catalyst is filtered and the filtrate subjected to distillation for the recovery of the ester.

The examples illustrate preferred embodiments of the invention in which parts are by weight unless otherwise indicated.

*Example 1.*—Ketene vapors (ca. 0.6m) were bubbled during 1.5 hours through a mixture of 33.2 g. ethyl ortho-formate, $HC(OC_2H_5)_3$, and 0.9 g. boron fluoride (dissolved below 0°), with stirring, at a temperature of 0° C. Dry sodium bicarbonate (3 g.) was added. The mixture was filtered and the filtrate distilled at reduced pressure from 1 g. sodium bicarbonate, giving 21.9 g. of 1.5° boiling range fraction of ethyl 3,3-diethoxypropionate, $$(C_2H_5O)_2CHCH_2COOC_2H_5$$

This corresponds to a 51.5% conversion of ethyl ortho-formate to ethyl diethoxypropionate, which is a liquid boiling at 58.5° C./1.5 mm. It is soluble in water and the common organic solvents, and has a refractive index ($N_D^{25°}$) of 1.4088. Its identity was confirmed by saponification number (305.4, 306.6 vs. 295 theoretical) and total carbonyl number (293.8, 293.7 vs. 295 theoretical).

*Example 3.*—Ketene (ca. 0.8m) was bubbled during two hours through a stirred mixture of 29.9 g. ethyl ortho-formate and 0.4 g. boron fluoride (dissolved at 0° C.). The temperature was 0° during the first hour, 25° for the next half hour. The product was washed with aqueous sodium bicarbonate and dried (with some loss) over anhydrous potassium carbonate. The filtrate was distilled at reduced pressure, giving 18.1 g. (47% conversion) of ethyl 3,3-diethoxypropionate.

The examples illustrate discontinuous in contrast to continuous type operation but the nature of the reactants is such that operation can likewise be conducted with advantage by way of a continuous process. Such a process may be carried out by passing at controlled rates ketene and the carboxylic acid ortho-ester together with catalyst into a tubular reaction zone of considerable length wherein the temperature of the reaction is controlled by means of a cooling jacket, the products issuing from the converter being neutralized and the resulting neutral or basic mixture subjected to distillation for the recovery of the ester. When so operating a solid acid catalyst may be used, supported or not, and the fluid reactants passed over it.

The alkoxy-substituted esters of the invention are valuable solvents and plasticizers for use in the plastic and related arts and are likewise suitable as intermediates for the preparation of valuable organic compounds.

I claim:

1. A process for the preparation of a 3,3-dialkoxy propionic acid ester which comprises bubbling ketene vapors into a mixture of an alkyl ortho-formate and an acid catalyst, alkyl ortho-formate having the structural formula: $(RO)_3CH$ in which R designates similar alkyl groups, the reaction being initiated at a temperature of about 0° C., continuing the reaction until no more ketene is absorbed, neutralizing the catalyst and thereafter removing the 3,3-dialkoxy propionic acid ester from the reaction mixture by distillation.

2. A process for the preparation of ethyl 3,3-diethoxypropionate which comprises bubbling ketene vapors into a mixture of ethyl ortho-formate and boron fluoride, the reaction being initiated at a temperature of about 0° C., continuing the reaction until no more ketene is absorbed, neutralizing the catalyst and thereafter removing the ethyl 3,3-diethoxypropionate from the reaction mixture by distillation.

3. A process for the preparation of ethyl 3,3-diethoxypropionate which comprises cooling a mixture containing ethyl ortho-formate and an acid catalyst to a temperature of about 0° C., introducing ketene to the resulting mixture until no more ketene is absorbed and thereafter removing the ethyl-3,3-diethoxypropionate from the reaction mixture after neutralization by distillation.

WILLIAM F. GRESHAM.

REFERENCES CITED

The following references are of record in the file of this patent:

UNITED STATES PATENTS

| Number | Name | Date |
|---|---|---|
| 2,407,302 | Spence et al. | Sept. 10, 1946 |

OTHER REFERENCES

Staudinger et al., "Helv. Chim. Acta," vol. 5, (1922), page 655.

Ingold, "Jour. Chem. Soc." (London), vol. 127, page 1203.